United States Patent
Nicol et al.

(10) Patent No.: US 9,078,033 B2
(45) Date of Patent: Jul. 7, 2015

(54) COAX AND IP HYBRID DIGITAL TV AND VOD SYSTEM

(75) Inventors: David Nicol, Edinburgh (GB); Stuart Clark, Glasgow (GB); Mark Bryars, Glasgow (GB); David Hulse, Athens (GR)

(73) Assignee: Guest Tek Interactive Entertainment Ltd., Calgary (CA)

( * ) Notice: Subject to any disclaimer, the term of this patent is extended or adjusted under 35 U.S.C. 154(b) by 297 days.

(21) Appl. No.: 12/463,993

(22) Filed: May 11, 2009

(65) Prior Publication Data

US 2010/0251316 A1 Sep. 30, 2010

Related U.S. Application Data

(60) Provisional application No. 61/164,253, filed on Mar. 27, 2009.

(51) Int. Cl.
| | | |
|---|---|---|
| *H04N 21/434* | (2011.01) | |
| *H04N 21/442* | (2011.01) | |
| *H04N 21/239* | (2011.01) | |
| *H04N 21/266* | (2011.01) | |
| *H04N 21/238* | (2011.01) | |
| *H04N 21/24* | (2011.01) | |
| *H04N 21/647* | (2011.01) | |
| *H04N 21/262* | (2011.01) | |
| *H04N 21/2385* | (2011.01) | |

(Continued)

(52) U.S. Cl.
CPC ......... *H04N 21/4345* (2013.01); *H04N 21/442* (2013.01); *H04N 21/44209* (2013.01); *H04N 21/239* (2013.01); *H04N 21/26616* (2013.01); *H04N 21/238* (2013.01); *H04N 21/24* (2013.01); *H04N 21/64738* (2013.01); *H04N 21/2402* (2013.01); *H04N 21/26216* (2013.01); *H04N 21/2385* (2013.01); *H04H 20/77* (2013.01); *H04N 7/10* (2013.01); *H04N 7/17318* (2013.01); *H04N 7/17336* (2013.01); *H04N 21/2143* (2013.01); *H04N 21/47202* (2013.01); *H04N 21/6118* (2013.01); *H04N 21/6168* (2013.01); *H04N 21/64322* (2013.01)

(58) Field of Classification Search
USPC .......................................................... 725/39
See application file for complete search history.

(56) References Cited

U.S. PATENT DOCUMENTS 6,041,056 A * 3/2000 Bigham et al. ........... 370/395.64
2001/0036199 A1* 11/2001 Terry ............................ 370/487

(Continued)

FOREIGN PATENT DOCUMENTS

| CN | 1674473 A | 9/2005 |
|---|---|---|
| CN | 101166068 A | 4/2008 |

(Continued)

OTHER PUBLICATIONS

European Patent Application No. 10157066.1 European Search Report mailed Jul. 23, 2010.

(Continued)

*Primary Examiner* — Justin Shepard
(74) *Attorney, Agent, or Firm* — ATMAC Patent Services Ltd.; Andrew T. MacMillan

(57) ABSTRACT

Methods and apparatus are described for providing digital information and/or data services over hybrid network infrastructures including both IP and coax transmission media.

22 Claims, 5 Drawing Sheets

(51) Int. Cl.
*H04N 7/10* (2006.01)
*H04N 7/173* (2011.01)
*H04N 21/214* (2011.01)
*H04N 21/472* (2011.01)
*H04N 21/61* (2011.01)
*H04N 21/643* (2011.01)
*H04H 20/77* (2008.01)

(56) References Cited

U.S. PATENT DOCUMENTS

| | | |
|---|---|---|
| 2002/0046406 A1 | 4/2002 | Chelehmal et al. |
| 2006/0248213 A1* | 11/2006 | Sherer et al. ............... 709/231 |
| 2007/0081537 A1* | 4/2007 | Wheelock .................... 370/392 |
| 2007/0094691 A1* | 4/2007 | Gazdzinski ................... 725/62 |
| 2007/0107013 A1* | 5/2007 | Seppala et al. ............... 725/39 |
| 2007/0153820 A1 | 7/2007 | Gould |
| 2007/0240192 A1* | 10/2007 | Acharya et al. ............... 725/87 |
| 2009/0036152 A1* | 2/2009 | Janneteau et al. ............ 455/503 |
| 2009/0232088 A1* | 9/2009 | Wisely ......................... 370/331 |
| 2010/0031288 A1* | 2/2010 | Scott et al. ................... 725/38 |

FOREIGN PATENT DOCUMENTS

| | | |
|---|---|---|
| CN | 101346006 A | 1/2009 |
| EP | 1 953 936 A2 | 8/2008 |
| KR | 100 841 918 B1 | 6/2008 |
| WO | 02/104024 A1 | 12/2002 |
| WO | 03/049445 A2 | 6/2003 |
| WO | 2005/002057 | 1/2005 |
| WO | 2007117613 A2 | 10/2007 |

OTHER PUBLICATIONS

VideoPropulsion—Bandwidth Connecting People to Content, Torrent Q20IP 20 Channel RF EdgeQAM, http://www.videopropulsion.com/products/q20ip, 2 pages, printed on Apr. 20, 2009.

* cited by examiner

COAX AND IP HYBRID DIGITAL TV AND VOD SYSTEM

RELATED APPLICATION DATA

The present application claims priority under 35 U.S.C. to U.S. Provisional Patent Application No. 61/164,253 entitled COAX AND IP HYBRID DIGITAL TV & VOD SYSTEM filed on Mar. 27, 2009, the entire disclosure of which is incorporated herein by reference for all purposes.

BACKGROUND OF THE INVENTION

The present invention relates to providing digital information and/or data services over hybrid network infrastructures including both IP and coax transmission media.

Current practice within enhanced digital television and video-on-demand (VOD) systems is to deliver digital TV and VOD services either using RF frequencies over existing coaxial cable (coax) infrastructure (e.g., via QAM data transfer or highly segmented coax loops with IP-over-coax data transfer), or via Internet Protocol (IP) solutions (e.g., via Ethernet cable infrastructure using IP).

In the hospitality industry, a large segment of the market for such services still relies heavily on coax infrastructure; some entirely, and others having newer parts of their infrastructures being IP-based while older parts still employ coax.

IP-over-coax solutions are characterized by an inherent problem in that coax does not have the available bandwidth to deliver the television and video services people demand using this approach; particularly high definition video. IP-over-coax also requires fairly radical modifications to conventional coax infrastructure to make it work at all. That is, in order to provide sufficient bandwidth, the long loops employed by conventional coax infrastructures must be segmented into much smaller loops or segments.

Cable television providers have long provided television and video services over coax using quadrature amplitude modulation (QAM) in the downstream direction, and IP-over-coax for the return path (which typically has much lower bandwidth requirements). The combination of QAM in one direction and IP-over-coax in the other allows such solutions to avoid having to make the alterations to the existing coax infrastructure required by a fully IP-over-coax solution.

However, these solutions do not address the needs of facilities having infrastructures which include both IP and coax. An example would be a hotel with an older wing that only has a coax network infrastructure, and a newer wing having an IP infrastructure. In such facilities, separate solutions are typically required to provide data and video services to the guest rooms on both infrastructures.

SUMMARY OF THE INVENTION

According to the present invention, various methods and apparatus are provided for providing digital information and/or data services over hybrid network infrastructures including both IP and coax transmission media. According to a particular class of embodiments, a network is provided which includes a first transmission infrastructure comprising coaxial cable over which data are transmitted using a radio frequency (RF) modulation scheme. The network also includes a second transmission infrastructure over which data are transmitted using the Internet Protocol (IP). One or more data servers are configured to provide data services including both digital television services and video-on-demand services. One or more coax servers are configured to receive via the second transmission infrastructure first data transmissions originating from the one or more data servers and intended for first client devices connected to the first transmission infrastructure. The one or more coax servers are further configured to convert the first data transmissions for transmission to the first client devices over the first transmission infrastructure using the RF modulation scheme. The one or more data servers provide the data services to the first client devices via the one or more coax servers and the first transmission infrastructure, and to second client devices connected via the second transmission infrastructure.

According to another class of embodiments, a coax server is provided for use in a network including a first transmission infrastructure comprising coaxial cable over which data are transmitted using a radio frequency (RF) modulation scheme, and a second transmission infrastructure over which data are transmitted using the Internet Protocol (IP). The network further includes one or more data servers configured to provide data services including both digital television services and video-on-demand services. The coax server includes one or more coax ports configured for connection to the first transmission infrastructure. The coax server further includes one or more IP ports configured for connection to the second transmission infrastructure and to receive first data transmissions originating from the one or more data servers and intended for first client devices connected to the first transmission infrastructure. The coax server further includes an up-converter configured to convert the first data transmissions for transmission to the first client devices over the first transmission infrastructure using the RF modulation scheme. The coax server further includes a program stream manager configured to provide coax channel mapping information to at least one of the one or more data servers. The coax channel mapping information including coax channel tuning information for specific program streams generated by the one or more data servers. The coax channel mapping information is configured to enable the first client devices to receive selected ones of the specific program streams.

According to another class of embodiments, methods and apparatus are provided for providing data services in a network including a first transmission infrastructure comprising coaxial cable over which data are transmitted using a radio frequency (RF) modulation scheme, and a second transmission infrastructure over which data are transmitted using the Internet Protocol (IP). The network further including one or more data servers configured to provide the data services. The data services including both digital television services and video-on-demand services. First data transmissions are received which originate from the one or more data servers and are intended for first client devices connected to the first transmission infrastructure. The first data transmissions are converted for transmission to the first client devices over the first transmission infrastructure using the RF modulation scheme. Coax channel mapping information is provided to at least one of the one or more data servers. The coax channel mapping information includes coax channel tuning information for specific program streams generated by the one or more data servers. The coax channel mapping information is configured to enable the first client devices to receive selected ones of the specific program streams.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, a system is provided in which a single solution simultaneously provides information and/or data services via both types of infrastructure, i.e., over both IP (e.g., implemented using CAT-5 or CAT-5e cabling and/or wireless networking components) and coax (implemented using coaxial cable) transmission media. One or more coax servers are provided in the system which operate as media converters, converting traffic between the IP and coax domains. Thus, if a property or installation includes both types of network infrastructure, its data and video needs may be provided with a single solution. In addition, if a property plans to convert its infrastructure from coax to IP (either gradually or all at once), the solution provided by the present invention allows for such conversion without a substantial re-investment during or after the conversion. The coax server sits between the IP infrastructure and the coax infrastructure and acts as a proxy for the coax infrastructure, i.e., the multimedia IP infrastructure is not aware of the existence of the coax infrastructure.

Figure 1:
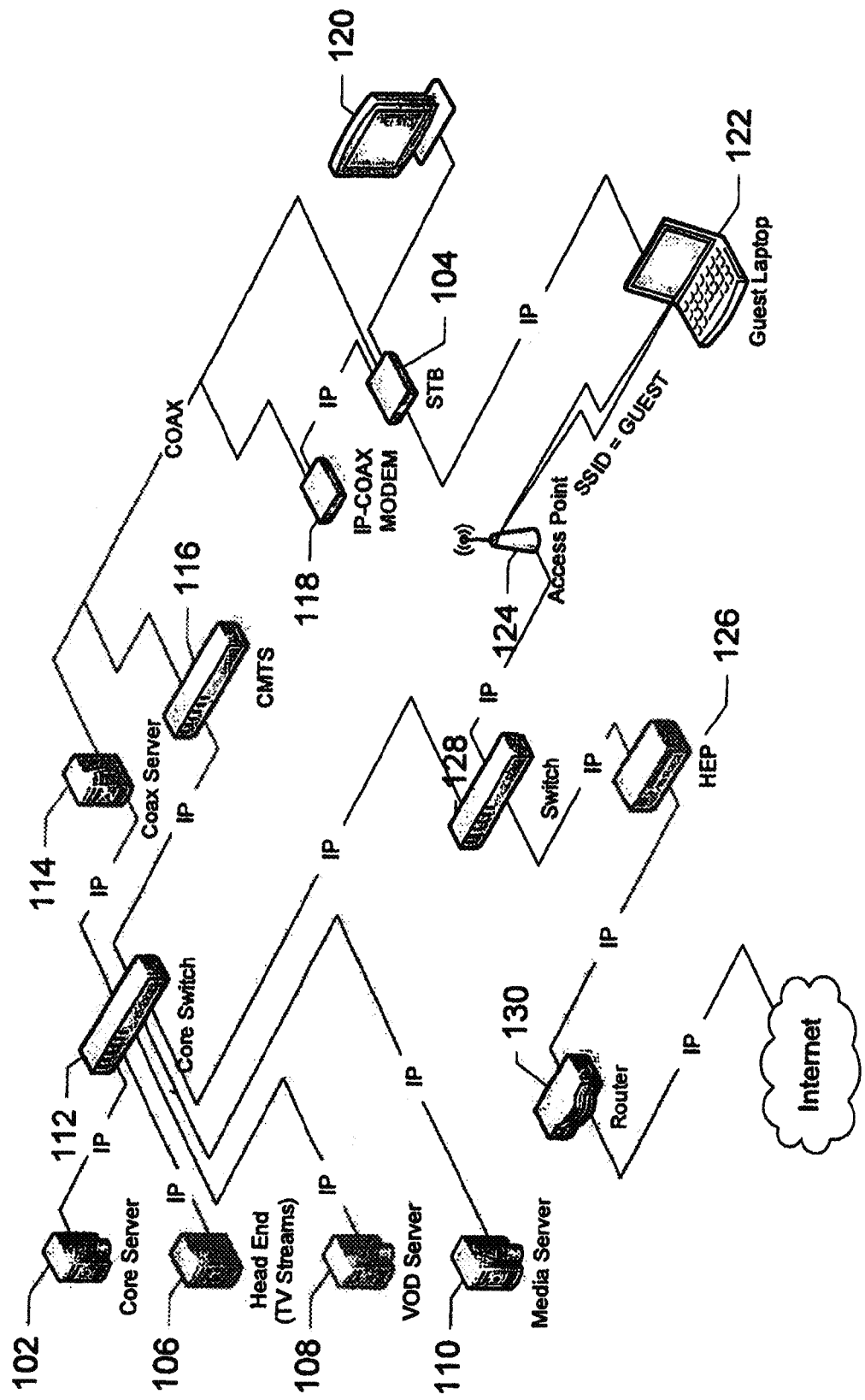
FIG. 1 is a simplified network diagram illustrating a network architecture implemented according to a specific embodiment of the invention having a coax modem IP return path.
Figure 4:
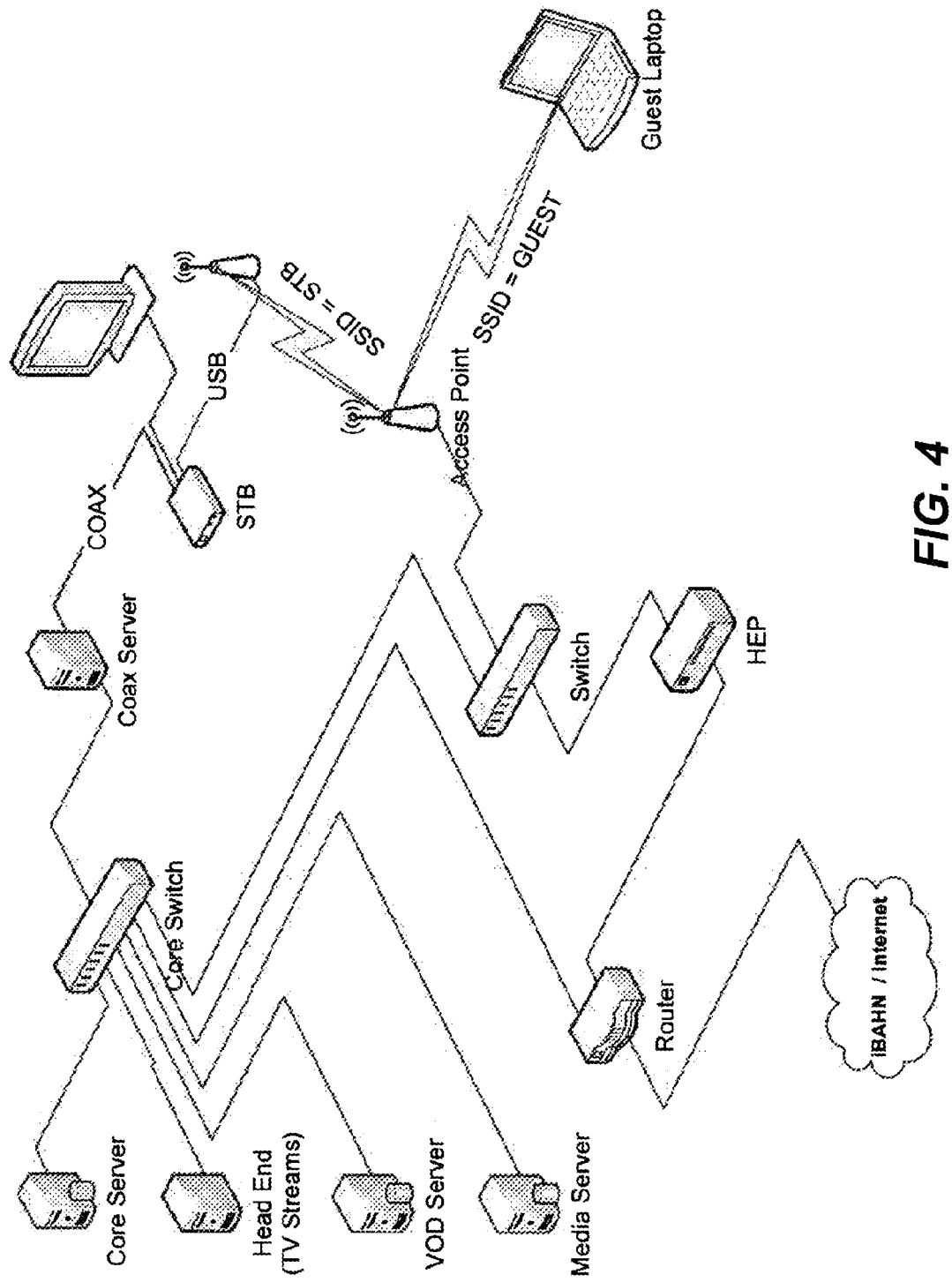
FIG. 4 is a simplified network diagram illustrating a network architecture implemented according to another embodiment of the invention having a WiFi IP return path.

FIG. 1 is a network diagram of a hybrid IP and coax system implemented in accordance with a specific embodiment of the invention. In this example, the hybrid infrastructure is deployed in a hotel property, and provides a variety of services including digital television and video-on-demand (VOD) (in both standard and high definition, SD and HD), Internet access, and a variety of other guest services including, for example, remote checkout, wake up calls, room service, etc. It should be noted that this is merely one example of a context in which such a hybrid infrastructure might be implemented in accordance with the invention. Other implementation contexts as well as a broad range of services and service sets are contemplated to be within the scope of the invention. That is, any infrastructure context in which both types of network infrastructure exist or are desirable may benefit from the present invention. For example, FIG. 4 illustrates another architecture example with a WiFi IP return path.

A core server 102 provides the set top boxes (STBs) in the system, e.g., STB 104, with user interfaces (including language translation), firmware updates, billing management, etc. It also hosts the system database and billing system. Core server 102 is what the system's STBs communicate with to facilitate access to and/or the purchase of services by hotel guests. According to a specific implementation, core server 102 employs Apache web server and Apache Tomcat which is an implementation of the Java Servlet and JavaServer Pages technologies.

Head end server 106 (typically an array of servers) receives the digital television channels from any of a variety of sources (e.g., European DVB-C signals, U.S. proprietary satellite signals, etc.) and makes them available for transmission to STBs on both parts of the infrastructure. Head end server 106 may encrypt the signals, or employ the encryption required by the content provider.

VOD server 108 (again typically an array of servers) hosts the "on demand" video content (e.g., feature films) and makes this content available for transmission to requesting users. VOD server 108 enables video control functionality such as play, pause, fast forward, rewind, skip forward, skip back, etc. Examples of VOD servers that may be employed with systems implemented according to specific embodiments are provided by BitBand Technologies Ltd. of Netanya, Israel.

Media server 110 provides content previews (e.g., movie trailers) and other promotional content with a stripped down set of the typical video control functions, e.g., skip forward and back, but no fast forward or rewind. Media server 110 also provides backdrop videos.

Core switch 112 (e.g., a network switch from Cisco Systems, Hewlett-Packard, etc.) provides the connections between the various IP-based servers and coax server 114 and IP-coax modem 116. As described in greater detail below, coax server 114 provides the media conversion from the IP domain to the coax domain for the IP-based servers, i.e., head end server 106, VOD server 108, and media server 110. Cable modem termination system (CMTS) 116 provides the conversion to and from IP-over-coax for the transmissions between core server 102 and the STBs on the coax infrastructure, e.g., STB 104. That is, in the depicted embodiment, the lower bandwidth requirements of the traffic to and from core server 102 allow for the use of IP-over-coax as the transmission mechanism on the coax infrastructure. Thus, in this particular implementation, the return path from the STBs is an IP-over-coax path.

An IP-coax modem 118 is in the guest rooms on the coax infrastructure to demodulate the downstream IP-over-coax signals to standard Ethernet for STB 104 as well as to modulate the signals from STB 104 for transmission upstream. A QAM tuner (not shown) in STB 104 is connected to the coax infrastructure for receiving the program streams from the Coax Server 114 originating from the IP-based servers. STB 104 then provides its output to television 120. STB 104 also receives input from a remote control (not shown) in the guest room which is the primary mechanism used by the guest to navigate user interfaces on TV 120 and to select from among and purchase the variety of available services.

Guests may connect their personal computing devices, e.g., guest laptop 122, to the system via wireless access points, e.g., WAP 124, which are in turn connected to Internet access server 126 via switch 128. The final connection to the Internet for the traffic to and from both core switch 112 and switch 128 is provided via router 130. Internet access server may be provided, for example, by iBAHN of Salt Lake City, Utah. As shown, guests may also establish a wired connection to the Internet by plugging their laptops into STB 104 (e.g., via an Ethernet port) which then employs the IP return path provided by IP-coax modems 116 and 118. Alternatively, the return path through IP-coax modems 116 and 118 may be established via a wireless access point (not shown) situated between laptop 122 and IP-coax modem 118.

According to various embodiments, coax server 114 operates primarily as a media converter that converts from Ethernet in the IP domain to QAM in the coax domain. According to a specific implementation, coax server 114 operates on a Linux platform and converts multiple MPEG-2 (SD or HD) or H.264 (HD) Single Program Transport Streams via Ethernet (IPTV) to several Multiple Program Transport Stream via coax using the DVB-C standard at QAM256. It should be noted that other standards may be employed.

A coax program refers to a single television, VOD, or data program stream. Multiple programs are multiplexed together and broadcast on a coax channel which is defined by a center frequency. Each transport stream is allocated a slot in the available bandwidth of an output channel. It should be noted that QAM is merely one example of a modulation scheme by which bandwidth in a coax infrastructure may be allocated. Other modulation schemes (e.g., quadrature phase shift keying (QPSK)) are within the scope of the invention.

According to a particular implementation, the programs from head end server 106 and from VOD server 108 are handled differently. IPTV streams from head end server 106 are always allocated coax programs since these are essentially always on. By contrast, and depending on viewer demands, VOD streams are assigned a coax program when requested. As described below, because STB 104 communicates with coax server 114 rather than directly with VOD server 108, coax server 114 includes a Real-Time Streaming Protocol (RTSP) Proxy Server/Client to manage VOD content.

Figure 2:
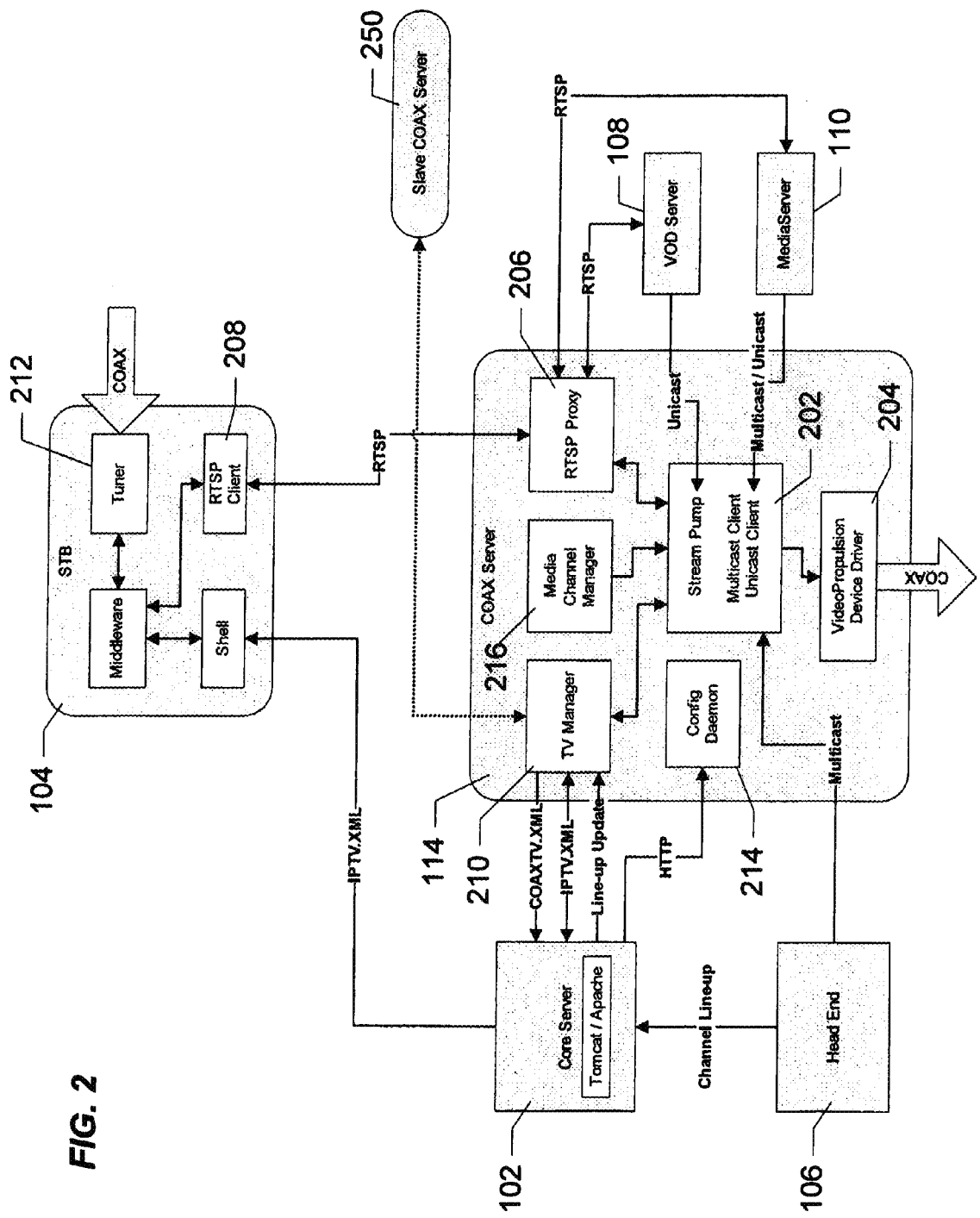
FIG. 2 is a block diagram of coax server implemented according to a specific embodiment of the invention.

FIG. 2 is a block diagram illustrating implementation of a coax server 114 according to a specific embodiment of the invention. The core process of coax server 114 is stream pump 202 which is a multi-threaded manager that manages the streams of data directed to STBs on the coax infrastructure. Stream pump 202 allocates the program streams in the coax channel multiplex and performs streaming of IP data into the multiplex. Stream pump 202 receives data from multiple external sources, i.e., head end server 106, VOD server 108, and media server 110, and manages operation of QAM upconverter 204 which generates the QAM output transmitted on the coax infrastructure. According to a particular implementation, stream pump 202 receives the IP stream source details (e.g., multicast/unicast protocol, interface, IP address, port number) and the required data bandwidth. Stream pump 202 then allocates bandwidth within a suitable channel on a "best fit" basis. According to a specific implementation, upconverter 204 is the Q8 PCI adapter provided by VideoPropulsion Interactive Television, Inc. of Slinger, Wis.

Figure 5:
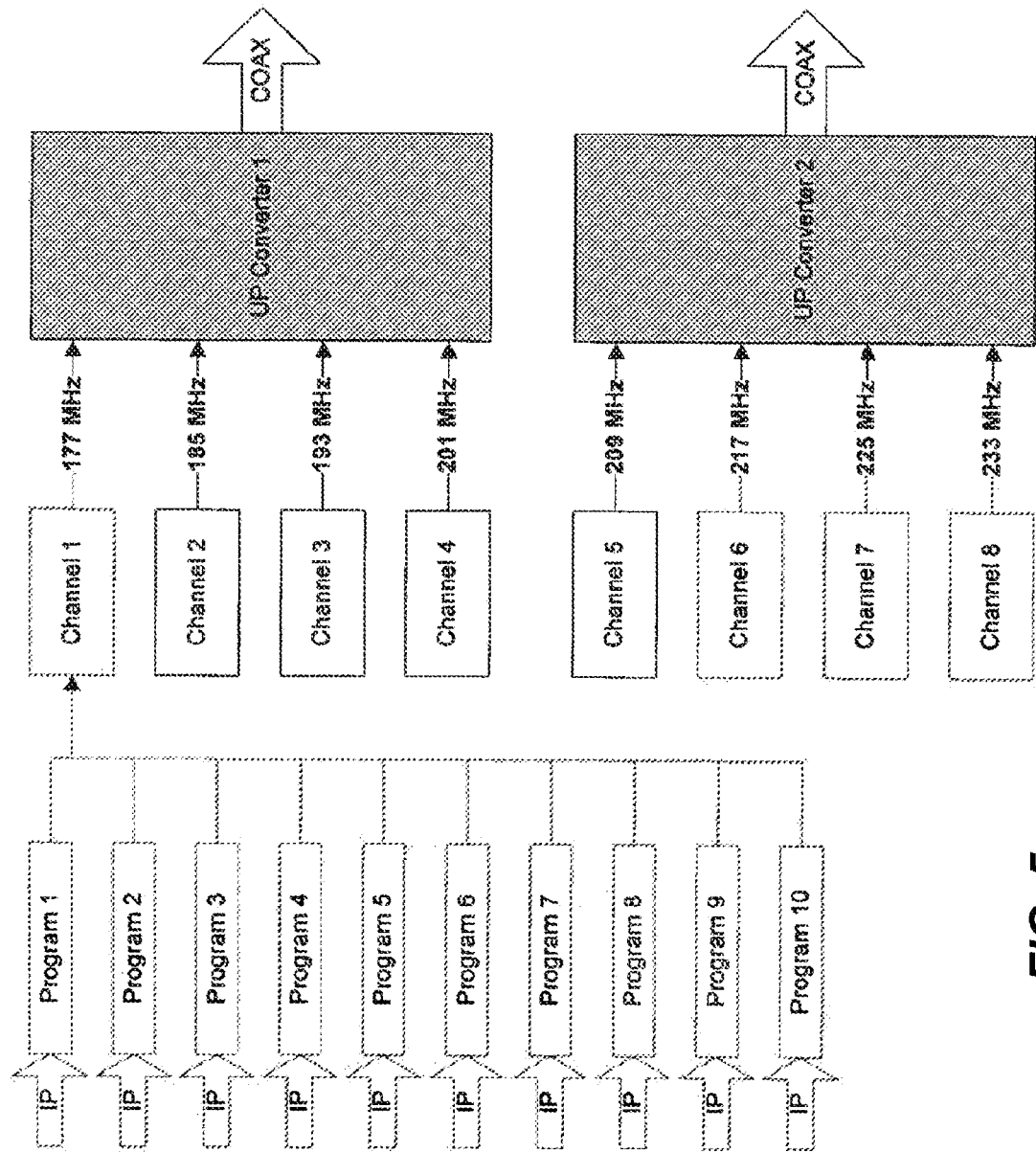
FIG. 5 shows an example program/frequency allocation according to an embodiment of the invention.

Clients are returned a pointer to a structure containing the program details including the Program ID and frequency. FIG. 5 shows an example program/frequency allocation. In this example, programs 1-10 are allocated to channel 1 at 177 MHz. A tuner tuned to 177 MHz will be able to select one of the ten programs available.

The data from head end server 106 are multicast data because users can selectively receive live broadcasts. The data from VOD server 108 are unicast data because they are responsive to a request for specific video content by a guest in a particular room. The data from media server 110 may be both multicast (e.g., backdrop videos) and unicast (e.g., content previews and other promotional content).

As discussed above, coax server 114 includes RTSP proxy 206 which mediates requests from RTSP client 208 in STB 104 for unicast content from VOD server 108 and media server 110. With input from RTSP proxy 206 and the relevant server, stream pump 202 places the unicast content on a specific coax channel unknown to any other parts of the system beside the STB from which the request originated, e.g., STB 104. According to a particular implementation, RTSP proxy 206 instructs stream pump 202 to allocate a coax channel of sufficient bandwidth to suit the content and creates a unicast connection to VOD server 108. Proxy 206 then establishes an RTSP connection with VOD Server 108 and maintains the connection, e.g., using keep-alive notices. STB 104 also uses keep-alive notices with proxy 206. The assigned coax program tuning information is returned to STB 104 via proxy 206 in the responses that make up the RTSP connection.

TV Manager 210 is responsible for assigning coax program details for the digital television channels configured on core server 102 based on bandwidth requirements, e.g., HD vs. SD. TV Manager 102 also provides tuning information back to core server 102 mapping the assigned coax channels to the IP addresses of the corresponding digital television channels. This information is then provided to STB 104 (via the IP-over-coax path) so that tuner 212 can tune to the channels selected by the guest via the IP-over-coax path from STB 104 to core server 102.

TV Manager 210 fetches the TV channel line-up from core server 102 and instructs stream pump 202 to allocate a coax program for each TV channel. If the line-up changes during operation, an update multicast message is sent from core server 202, and TV manager 210 adjusts its stream allocation instructions to stream pump 202 accordingly. TV Manager 210 then communicates the new tunings back to core server 102 (via an xml file). The STBs then receive the new tunings for the updated channel line-up from core server 102.

Configuration daemon 214 is responsible for managing the configuration settings from the core server to processes operating on coax server 114, and watching for activity on the other servers in the system. Media Channel Manager 216 is responsible for managing the loop of content previews from media server 110. Media Channel Manager 216 generates metadata that are associated with the content loop so that the IP side of the system knows which preview is currently being viewed so that, if a guest chooses to purchase that content (or some other related service), the content is properly identified in the communication from STB 104 to core server 102 via the IP-over-coax return path.

Figure 3:
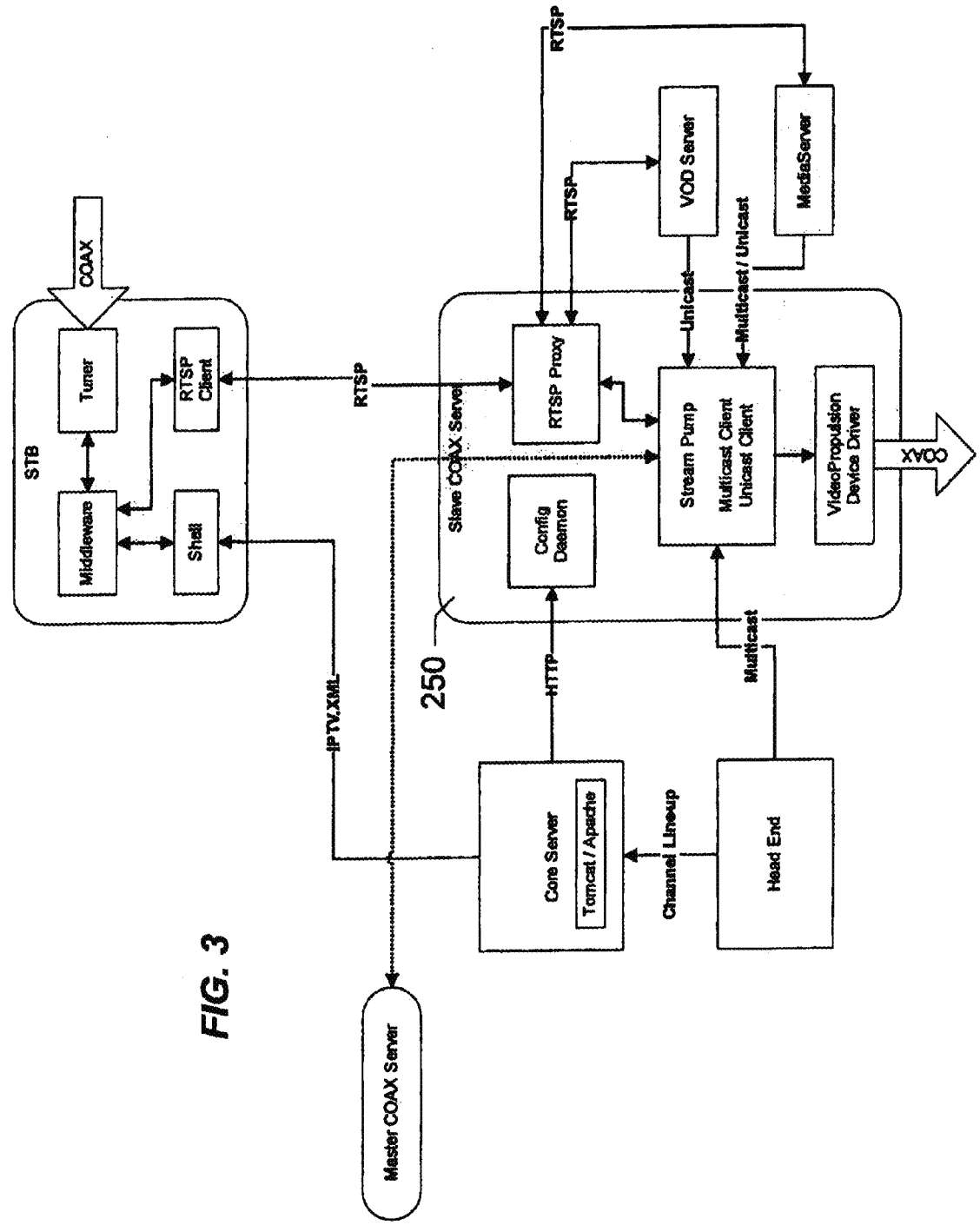
FIG. 3 is a block diagram of a slave coax server implemented according to a specific embodiment of the invention.

To support larger installations that require more coax channels, any number of additional coax servers can be configured as slave coax servers (e.g., slave 250) to integrate with a master coax server (e.g., coax server 114). Such a slave coax server 250 may be implemented as shown in the block diagram of FIG. 3. The depicted processes operate in a manner similar to the corresponding processes in master coax server 114. The difference between master coax server 114 and slave coax server 250 is that the TV Manager and Media Channel Manager processes in server 114 are not required in server 250. That is, according to this particular implementation, only one TV Manager and one Media Channel Manager process are included in the system, each of which assigns jobs to the stream pumps in the all of the coax servers. In such a system, each coax server has a fixed frequency range and is assigned a base frequency. A suitable frequency range might be, for example, 64 MHz (i.e., 8 channels with 8 MHz spacing) with a starting base frequency of 50 MHz.

According to various embodiments, coax servers implemented in accordance with the invention operate independently of any encryption scheme encoded in the media streams. That is, such coax servers are not required to decrypt or alter the encryption data associated with such schemes in any way. According to a specific embodiment, coax servers are implemented to operate with unencrypted MPEG-2, H.264, ETVCrypt3, and Verimatrix.

While the invention has been particularly shown and described with reference to specific embodiments thereof, it will be understood by those skilled in the art that changes in the form and details of the disclosed embodiments may be made without departing from the spirit or scope of the invention. For example, specific details have been described herein that are specific to the context in which the implementation is intended to be deployed, e.g., DVB-C, the European digital television standard. However, those of skill in the art will appreciate that such details may be modified for implementation in a different context without departing from the scope of the invention, e.g., the relevant standards in the U.S. or any other country or region. Other examples of this relate to the use of solutions from specific vendors in implementing particular system components, e.g., a VideoPropulsion up-converter in the coax server. Suitable alternatives will be apparent to those of skill in the art. And the types of information and data services provided in accordance with the invention are not intended to be limited to the services described herein, e.g., digital television and video-on-demand. Rather, any type of information or data service that may be delivered in a program stream may be delivered according to the invention.

In addition, the functionality described herein may be implemented in a wide variety of ways without departing from the scope of the invention. For example, functionalities described herein may be implemented using computer program instructions stored in physical memory, e.g., any type of RAM or ROM, associated with the particular computing devices performing the described functions. Any of the various computing and programming tools and languages known to those of skill in the art which may be adapted for such purposes are within the scope of the present invention. Alternatively, at least some of the described functionality may be implemented using other types of hardware such as, for example, programmable logic devices, field-programmable gate arrays, application-specific integrated circuits, and the like. Again, suitable alternatives will be apparent to those of skill in the art.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system comprising:
    one or more data servers configured to provide data services including both digital television services and video-on-demand services to end users; and
    a hybrid network infrastructure comprising:
        a first transmission infrastructure comprising coaxial cable over which data are transmitted using a radio frequency (RF) modulation scheme;
        a second transmission infrastructure over which data are transmitted using the Internet Protocol (IP); and
        one or more coax servers configured to receive via the second transmission infrastructure first data transmissions originating from the one or more data servers and intended for first client devices connected to the first transmission infrastructure and associated with first ones of the end user,
    wherein the one or more coax servers are further configured to convert the first data transmissions for transmission to the first client devices over the first transmission infrastructure using the RF modulation scheme;
    each of the one or more coax servers is further configured to operate as a proxy for each of selected ones of the first client devices to which corresponding ones of the first data transmissions are directed by mediating requests from each of the selected ones of the first client devices for unicast content from the one or more data servers;
    the one or more data servers provide the data services to the first client devices via the second transmission infrastructure, the one or more coax servers, and the first transmission infrastructure;
    the one or more data servers provide the data services to second client devices associated with second ones of the end users, the second client devices receiving the data services via the second transmission infrastructure without using the first transmission infrastructure; and
    at least one coax server operates as a proxy by including a real time streaming protocol (RTSP) proxy configured to communicate with a RTSP client in at least one of the first client devices.

2. The system of claim 1, wherein:
    the first transmission infrastructure comprises the coaxial cable installed in a first part of a hospitality establishment; and
    the second transmission infrastructure is installed in a second part of the hospitality establishment.

3. The system of claim 2, wherein the first client devices are set top boxes (STBs) configured to control operation of associated televisions located in guest rooms in the first part the hospitality establishment.

4. The system of claim 1, wherein:
    the one or more data servers comprises a plurality of data servers;
    a first subset of the plurality of data servers is configured for multicast transmission; and
    a second subset of the plurality of data servers is configured for unicast transmission.

5. The system of claim 4, wherein a third subset of the plurality of servers is configured for both unicast and multicast transmission.

6. The system of claim 1, further comprising a coax modem termination system connected to both first and second transmission infrastructures and a plurality of IP-coax modems configured to facilitate transmission of communications between the first client devices and a first subset of the one or more data servers via the first transmission infrastructure using an IP-over-coax modulation scheme.

7. The system of claim 6, wherein the communications from the first client devices to the first subset of data servers facilitate selection of specific ones of the data services to be provided to the first client devices from which the communications originated.

8. The system of claim 7, wherein:
    each of the one or more coax servers is configured to provide metadata in association with a coax program stream delivered to the first client devices via the first transmission infrastructure; and
    the metadata is configured for use by the first client devices for generating the communications for the specific data services corresponding to the coax program stream with which the metadata are associated.

9. The system of claim 1, wherein:
at least one of the one or more coax servers is further configured to provide coax channel mapping information to at least one of the one or more data servers;
the coax channel mapping information includes coax channel tuning information for specific program streams generated by the one or more data servers; and
the at least one of the one or more data servers is configured to provide the coax channel tuning information to the first client devices.

10. The system of claim 1, wherein, according to input from the RTSP proxy, the at least one coax server is operable to place requested unicast content on a specific coax channel unknown to any other first client devices beside the first client device from which a request for the requested content originated.

11. A computer-implemented method for providing data services in a hybrid network infrastructure including a first transmission infrastructure comprising coaxial cable over which data are transmitted using a radio frequency (RE) modulation scheme, and a second transmission infrastructure over which data are transmitted using the Internet Protocol (IP), the hybrid network infrastructure further including one or more data servers configured to provide the data services to end users, the method comprising:
receiving first data transmissions originating from the one or more data servers and intended for first client devices connected to the first transmission infrastructure and associated with first ones of the end users;
converting the first data transmissions for transmission to the first client devices over the first transmission infrastructure using the RF modulation scheme;
providing coax channel mapping information to at least one of the one or more data servers, the coax channel mapping information including coax channel tuning information for specific program streams generated by the one or more data servers, the coax channel mapping information configured to enable the first client devices to receive selected ones of the specific program streams;
operating as a proxy for each of selected ones of the first client devices to which corresponding ones of the first data transmissions are directed by mediating requests from each of the selected ones of the first client devices for program streams from the one or more data servers, thereby using the one or more data servers to provide the data services to the first client devices via the second transmission infrastructure and the first transmission infrastructure;
providing the data services to second client devices associated with second ones of the end users via the second transmission infrastructure without using the first transmission infrastructure; and
operating as a proxy by including a real time streaming protocol (RTSP) proxy configured to communicate with a RTSP client in at least one of the first client devices.

12. The method of claim 11, wherein the RF modulation scheme comprises either quadrature amplitude modulation (QAM) or quadrature phase shift keying (QPSK).

13. The method of claim 11, wherein:
the one or more data servers are configured for unicast transmission and multicast transmission; and
the method further comprises allocating bandwidth associated with the first transmission infrastructure for both the unicast and multicast transmissions.

14. The method of claim 11, wherein:
the network further includes a plurality of IP-coax modems connected to both of the first and second transmission infrastructures and configured to facilitate transmission of communications between the first client devices and a first subset of the one or more data servers via the first transmission infrastructure using a cable modem termination and IP-over-coax modulation scheme;
the communications from the first client devices to the first subset of data servers facilitate selection of specific ones of the data services to be provided to the first client devices from which the communications originated; and
the method further comprises providing metadata in association with a first coax program stream delivered to the first client devices via the first transmission infrastructure, the metadata configured for use by the first client devices for generating the communications for the specific data services corresponding to the first coax program stream with which the metadata are associated.

15. The method of claim 11, further comprising, according to input from the RTSP proxy, placing requested unicast content on a specific coax channel unknown to any other first client devices beside the first client device from which a request for the requested content originated.

16. The method of claim 11, wherein the first client devices are set top boxes (STBs) located in guest rooms of a hospitality establishment, the guest rooms serviced by the first transmission infrastructure.

17. A system comprising:
one or more data servers configured to provide data services including both digital television services and video-on-demand services to end users; and
a hybrid network infrastructure comprising:
a first transmission infrastructure comprising coaxial cable over which data are transmitted using a radio frequency (RF) modulation scheme;
a second transmission infrastructure over which data are transmitted using the Internet Protocol (IP); and
one or more coax servers configured to receive via the second transmission infrastructure first data transmissions originating from the one or more data servers and intended for first client devices connected to the first transmission infrastructure and associated with first ones of the end user,
wherein the one or more coax servers are further configured to convert the first data transmissions for transmission to the first client devices over the first transmission infrastructure using the RF modulation scheme;
each of the one or more coax servers is further configured to operate as a proxy for each of selected ones of the first client devices to which corresponding ones of the first data transmissions are directed by mediating requests from each of the selected ones of the first client devices for unicast content from the one or more data servers;
the one or more data servers provide the data services to the first client devices via the second transmission infrastructure, the one or more coax servers, and the first transmission infrastructure;
the one or more data servers provide the data services to second client devices associated with second ones of the end users, the second client devices receiving the data services via the second transmission infrastructure without using the first transmission infrastructure;
a stream pump of at least one of the coax servers operates to place unicast content destined for a requesting one of the first client devices on a coax channel known by the requesting one of the first client devices; and
the at least one of the coax servers instructs the stream pump to allocate the coax channel with sufficient bandwidth to suit the unicast content destined for the requesting one of the first client devices.

18. The system of claim 17, wherein the proxy of the at least one of the coax servers communicates program tuning information to the requesting one of the first client devices in accordance with the coax channel on which the unicast content is placed.

19. The system of claim 17, wherein the first client devices are set top boxes (STBs) located in guest rooms of a hospitality establishment, the guest rooms serviced by the first transmission infrastructure.

20. A computer-implemented method for providing data services in a hybrid network infrastructure including a first transmission infrastructure comprising coaxial cable over which data are transmitted using a radio frequency (RE) modulation scheme, and a second transmission infrastructure over which data are transmitted using the Internet Protocol (IP), the hybrid network infrastructure further including one or more data servers configured to provide the data services to end users, the method comprising:
receiving first data transmissions originating from the one or more data servers and intended for first client devices connected to the first transmission infrastructure and associated with first ones of the end users;
converting the first data transmissions for transmission to the first client devices over the first transmission infrastructure using the RF modulation scheme;
providing coax channel mapping information to at least one of the one or more data servers, the coax channel mapping information including coax channel tuning information for specific program streams generated by the one or more data servers, the coax channel mapping information configured to enable the first client devices to receive selected ones of the specific program streams;
operating as a proxy for each of selected ones of the first client devices to which corresponding ones of the first data transmissions are directed by mediating requests from each of the selected ones of the first client devices for program streams from the one or more data servers, thereby using the one or more data servers to provide the data services to the first client devices via the second transmission infrastructure and the first transmission infrastructure;
providing the data services to second client devices associated with second ones of the end users via the second transmission infrastructure without using the first transmission infrastructure;
placing unicast content destined for a requesting one of the first client devices on a coax channel known by the requesting one of the first client devices according to input from a proxy of at least one of the coax servers and at least one of the data servers; and
allocating the coax channel with sufficient bandwidth via a stream pump to suit the unicast content destined for the requesting one of the first client devices.

21. The method of claim 20, further comprising communicating program tuning information to the requesting one of the first client devices in accordance with the coax channel on which the unicast content is placed.

22. The method of claim 20, wherein the first client devices are set top boxes (STBs) located in guest rooms of a hospitality establishment, the guest rooms serviced by the first transmission infrastructure.

* * * * *